United States Patent [19]

Morgan et al.

[11] Patent Number: 5,638,817
[45] Date of Patent: Jun. 17, 1997

[54] GAMMA CAMERA SPLIT COLLIMATOR COLLIMATION METHOD AND APPARATUS

[75] Inventors: Hugh T. Morgan, Highland Heights; Roger N. Lexa, Concord Twp.; Steven J. Plummer, Hudson, all of Ohio

[73] Assignee: Picker International, Inc., Highland Heights, Ohio

[21] Appl. No.: 483,276

[22] Filed: Jun. 7, 1995

[51] Int. Cl.$^6$ ............................................ H05G 1/02
[52] U.S. Cl. ............................ 128/653.1; 250/363.1; 378/147
[58] Field of Search ........................... 128/653.1, 633; 250/363.01–363.1, 370.08–370.11; 378/62, 145, 147, 148, 150; 364/413.19, 413.22, 413.14, 413.24

[56] References Cited

U.S. PATENT DOCUMENTS

| | | |
|---|---|---|
| 5,097,131 | 3/1992 | Plummer et al. . |
| 5,097,132 | 3/1992 | Plummer . |
| 5,231,654 | 7/1993 | Kwasnick et al. . |
| 5,231,655 | 7/1993 | Wei et al. . |
| 5,239,568 | 8/1993 | Grenier .................... 378/147 |
| 5,309,911 | 5/1994 | Grenier .................... 128/653.1 |
| 5,338,936 | 8/1994 | Gullberg et al. . |
| 5,376,795 | 12/1994 | Hasegawa et al. . |
| 5,479,021 | 12/1995 | Morgan et al. . |

*Primary Examiner*—Marvin M. Lateef
*Assistant Examiner*—Shawna J. Shaw
*Attorney, Agent, or Firm*—Fay, Sharpe, Beall, Fagan, Minnich & McKee

[57] ABSTRACT

A SPECT system includes two or more radiation detector heads (32) and (34) which are mounted opposite each other to a gantry (30) for rotation about a subject. Each detector head has a collimator (38) mounted in front of the detector head. The collimator (38) is separated into a top portion (40) and a bottom portion (42). The top portion (40) and bottom portion (42) are spaced from each other to provide a gap (44) within the collimator (38). The gap (44) receives one or more devices to provide additional functionality during a scan. The insertable devices include a transmission radiation source (52), a calibration source, a radiation filter, and others.

18 Claims, 3 Drawing Sheets

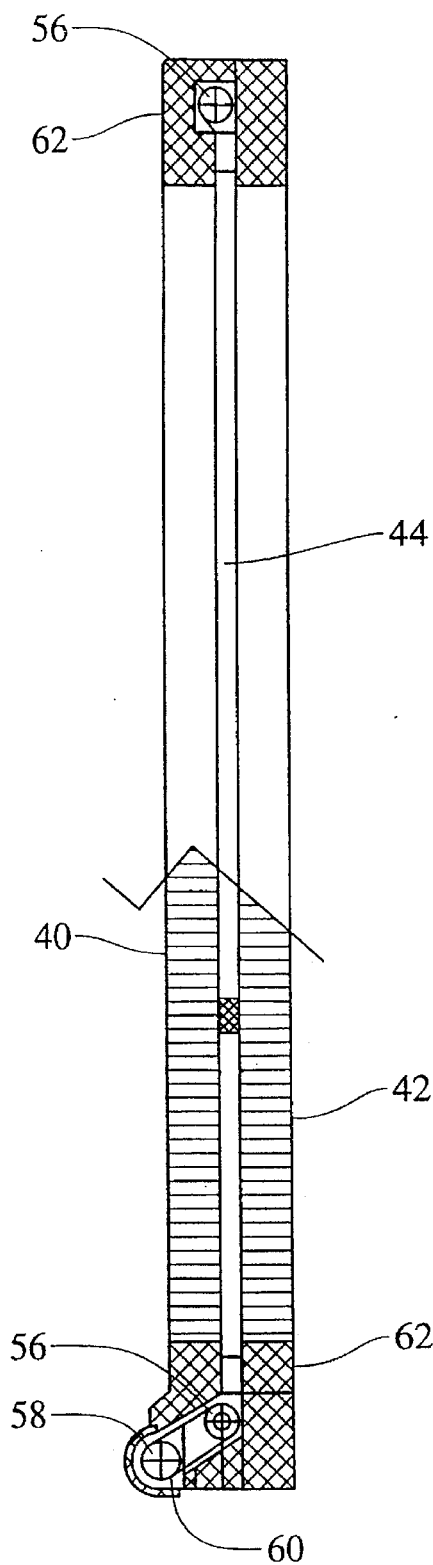
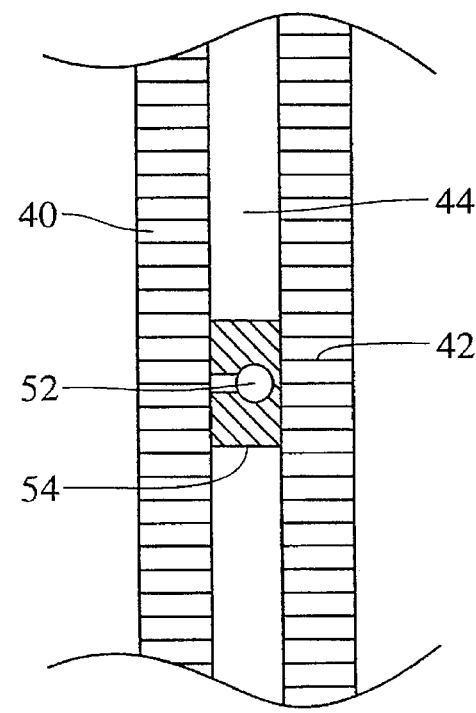
Fig.3A
Fig.3B

GAMMA CAMERA SPLIT COLLIMATOR COLLIMATION METHOD AND APPARATUS

BACKGROUND OF THE INVENTION

The present invention relates to the art of diagnostic imaging. It finds particular application in conjunction with single-photon emission computed tomography (SPECT) with single or multi-headed cameras and will be described with particular reference thereto. It is to be appreciated, however, that the invention will also find application in other non-invasive investigation techniques such as single photon planar imaging, whole body nuclear scans, positron emission tomography (PET) and other diagnostic modes.

Heretofore, single photon emission computed tomography has been used to study a radionuclide distribution in subjects. Typically, one or more radiopharmaceuticals are injected into a subject. The radiopharmaceuticals are commonly injected into the subject's blood stream for imaging the circulatory system or for imaging specific organs which absorb the injected radiopharmaceuticals. Gamma or scintillation camera heads are placed closely adjacent to a surface of the subject to monitor and record emitted radiation. In single photon-emission computed tomography, the head is rotated or indexed around the subject to monitor the emitted radiation from a plurality of directions. The monitored radiation data from the multiplicity of directions is reconstructed into a three dimensional image representation of the radiopharmaceutical distribution within the subject.

Each camera head typically includes a flat scintillation crystal which converts incident radiation to flashes of light. Internal electronics convert each flash of light into an indication of the location and energy of the received incident radiation event. Collimators are commonly mounted to the face of each camera head such that the scintillation crystal only receives radiation travelling along preselected rays. Generally, the collimators are a series of lead vanes arranged in a grid that limit the rays to parallel rays, diverging rays in a fan or cone pattern or the like. The height of the vanes and their spacing control the degree which received radiation may vary from the selected rays. Different collimators are provided for different types of medical procedures.

A variety of devices have been placed between the collimator and the subject in an effort to improve image resolution. However, placing devices between the collimator and the subject increases the distance between the subject and the camera head which decreases the image resolution.

Transmission radiation sources have been placed opposite the patient from a detector head. In one or three detector head systems, space is available to mount the radiation source. In a two head system, mounting the source opposite one head places it in front of the other. Its own collimator and shielding further increases the distance between the crystal and the subject in two detector head systems.

The present invention contemplates a new and improved collimator apparatus which overcomes the above-referenced problems and others.

SUMMARY OF THE INVENTION

A new and improved split collimator collimation method and apparatus for a SPECT or nuclear camera is provided. A gantry movably supports a pair of opposed detector heads for movement around an examination region. The detector heads receive radiation from the examination region and generates data indicative of the received radiation. A collimator is disposed between each detector head and the examination region and collimates the radiation received by each detector head. At least one of the collimators is separated laterally into a top portion disposed toward the subject and a bottom portion disposed toward the detector head. The top portion and bottom portion are separated from each other to define a gap. The gap is adapted to receive a functional device used during a planar imaging or a tomographic scan, or the like. A reconstruction processor reconstructs an image representation from the data generated by the detector heads.

In accordance with a more limited aspect of the present invention, the functional device received in the gap between the top portion and the bottom portion of the collimator is one of a transmission radiation source, a calibration source, a radiation filter, an ion chamber, and a film canister.

In accordance with a more limited aspect of the present invention, the top portion of the collimator is aligned with the bottom portion of the collimator.

In accordance with a yet more limited aspect of the present invention, the top portion of the collimator includes a collimation pattern and hole size that is a multiple of a collimation pattern and hole size of the bottom portion of the collimator. Preferably, the collimation patterns and hole sizes of the top and bottom portions are identical.

One advantage of the present invention is that the separated collimator provides a space for receiving a device which provides an additional function during the scanning process.

Another advantage of the present invention is that a transmission radiation source is receivable within the provided space within the collimator. The collimator then collimates the transmitted radiation in both directions toward the examination region and toward the detector head. The bottom portion of the collimator nearest the detector head reduces backscattered radiation reflected from the top portion of the collimator.

Another advantage of the present invention is that clearance between the detector head/collimator assembly and the subject is maintained.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 3A is an illustration of the split collimator and radiation source mounted within the collimator of a detector, in partial section; and, FIG. 3B is an enlarged sectional view of a portion of FIG. 3A.

DETAILED DESCRIPTION OF THE PREFERRED EMBODIMENTS

Figure 1:
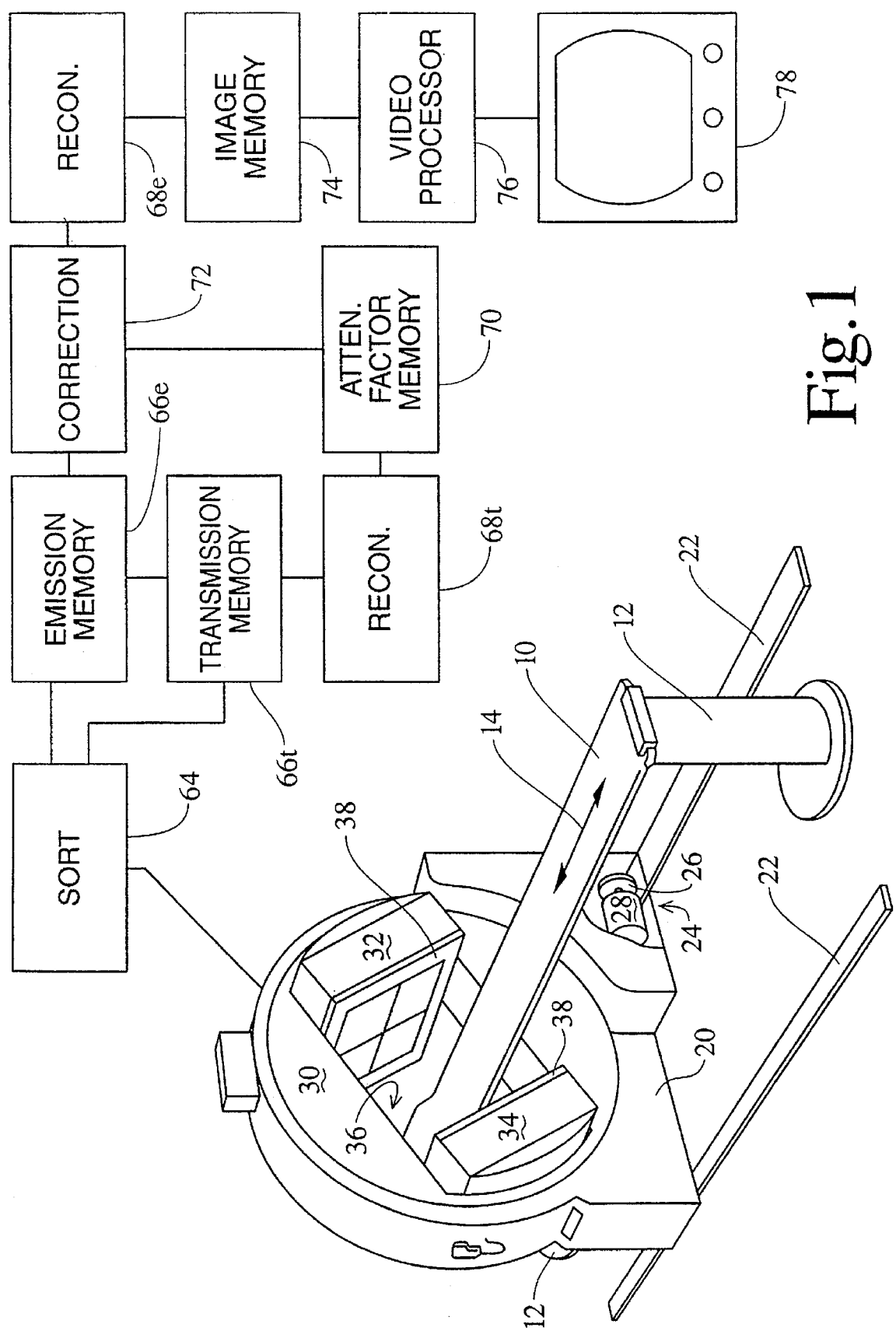
FIG. 1 is a perspective view of a gamma camera system in accordance with the present invention.

With reference to FIG. 1, a subject support or table 10 is mounted to stationary, vertical supports 12 at opposite ends.

The subject table is selectively positionable up and down to center the subject in the center of a circle along a longitudinal axis 14.

An outer gantry structure 20 is movably mounted on tracks 22 which extend parallel to the longitudinal axis. This enables the outer gantry structure to be moved parallel to the longitudinal axis 14. An outer gantry structure moving means 24 is provided for selectively moving the outer gantry structure 20 along the rails 22 in a path parallel to the longitudinal axis. In the illustrated embodiment, the longitudinal moving means includes drive wheels 26 for supporting the outer gantry structure on the tracks. A motive power source, such as a motor 28, selectively drives one of the wheels which frictionally engages the track and drives the outer gantry structure and supported inner gantry structure and detector heads therealong. Alternately, the outer gantry can be stationary and the subject support configured to move the subject along the longitudinal axis.

An inner gantry structure 30 is rotatably mounted on the outer gantry structure 20. A first camera or detector head 32 is movably mounted to the inner gantry structure. A second detector head 34 is movably mounted to the inner gantry structure opposite to the first camera head. The detector heads are independently movable toward and away from each other. The inner gantry structure defines a central, subject receiving aperture 36 for receiving the subject table and, particularly along the longitudinal axis. The aperture 36 is enlarged to receive the detector heads in any of a variety of displacements from a central axis and angular orientations.

The detector heads have collimators 38 removably mounted on a front face to restrict received radiation to radiation traveling generally perpendicular to the face. The face includes a scintillation crystal that emits a flash of light in response to incident radiation. An array of photomultiplier tubes convert the light into electrical signals. A resolver circuit resolves the x,y-coordinates of each light flash and the energy of the incident radiation.

Figure 2:
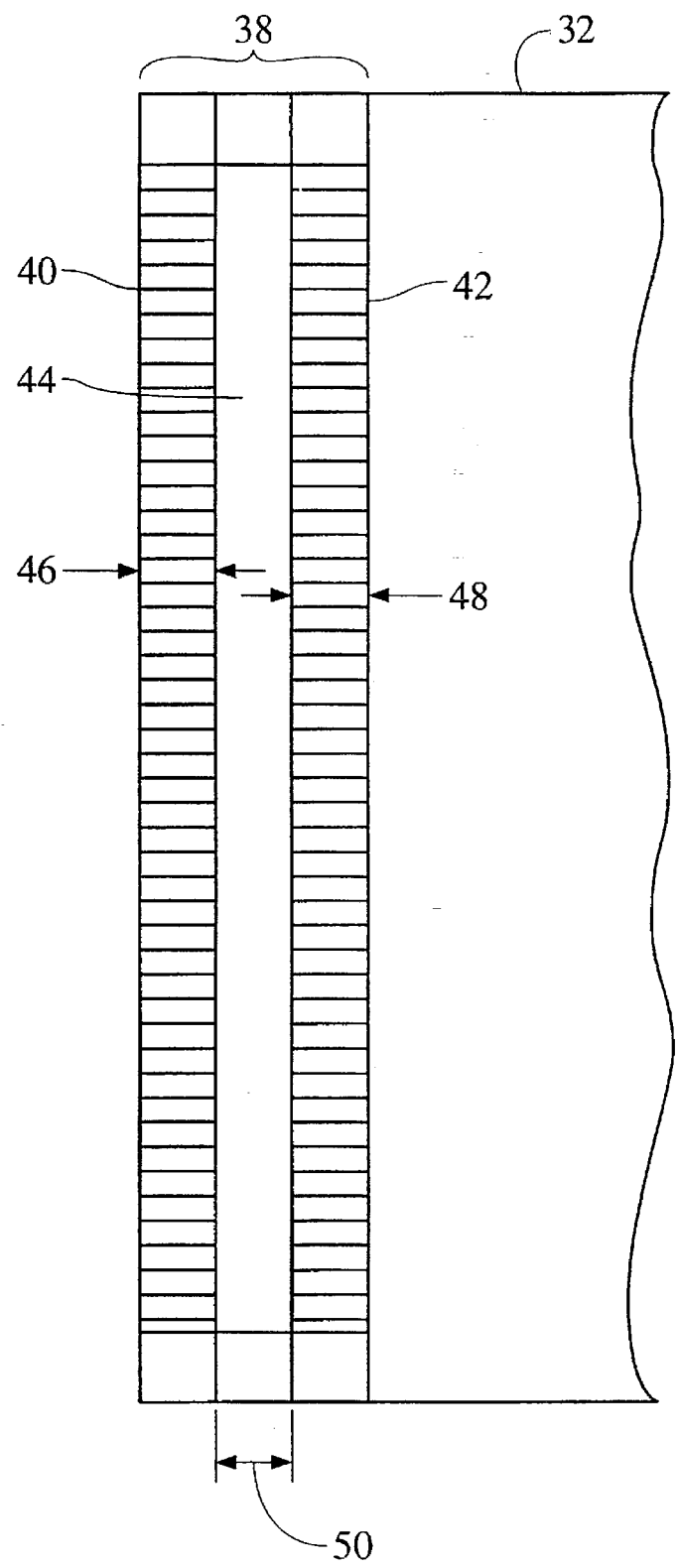
FIG. 2 is a cross-sectional side view of a split collimator in accordance with the present invention.

With reference to FIG. 2, the collimator 38 is split into a first portion 40 and a second portion 42. The first portion and the second portion are separated by an adjustable or fixed distance which provides a space 44 between the first and second portions 40 and 42. The space 44 is sized to receive one or more devices to provide additional functions during a scan.

The collimator 38 is split preferably in half such that the first portion 40 and second portion 42 have equal hole lengths 46 and 48. Alternatively, the collimator 38 can be split in any variety of first portion to second portion hole length ratios such as 60% to 40%, 75% to 25%, 80% to 20%, 40% to 60%, etc. The fraction of the split is chosen for optimally accomplishing the tasks of each portion of the collimator 38. Preferably, the height of the first and second portions and the space 44 between the first and second portions is about ½". Alternatively, an expansible mounting is provided to support the first portion such that a width of a space 50 is adjustable to accommodate the selected device inserted within the space 44.

The insertable device is any one of several types of transmission radiation line sources, a calibration source, radiation filters including energy selective filters and secondary emission filters, an ion chamber which finds the intensity of the radiation level, and a screen film imaging device as is common in radiography.

With reference to FIG. 3A and 3B, a radiation source 52 is disposed within the space 44 between the first portion 40 and second portion 42 of the collimator 38. Preferably, the radiation source 52 is a line source extending across the collimator 38. The line source is a thin steel tube that is filled with a radionuclide and is sealed at its ends. Optionally, the radiation source may be a bar source, a line source with elliptical cross-section, a point source, a flat rectangular source, a disk source, a flood source, a tube or vessel filled with a radionuclide. The radiation source 52 is disposed in a generally U-shaped source holder 54 made from a radiation blocking material, such as lead. The source holder 54 partially encases the radiation source 52 and serves as a radiation shield and collimator to limit the projection of radiation towards the first portion 40 of the collimator 38 and into the examination region 36. The source holder partially blocks radiation from the source 52 from striking the detector 32 and causing stray radiation events. The source holder is dimensioned to fit snugly in the gap to minimize passage of backscattered radiation between the source holder and the first collimator portion. Optionally, the holder can be biased into firm frictional engagement with the first collimator portion. The walls of the source holder 54 provide additional collimation.

Radiation transmitted from the radiation source 52 generally passes through the top portion 40 of the collimator 38 and into the examination region. However, some radiation is reflected off the top portion 40 and backscattered between the source holder 54 and the first collimator portion. A component of the backscattered radiation travels toward the detector head 32. Because the primary components backscattered radiation striking the second collimator portion at obtuse, near flat angles, the bottom portion 42 of the collimator 38 absorbs the backscattered radiation and reduces stray radiation events from being received by the detector head 32.

In an alternative embodiment, a manual or driven mechanical mechanism is connected to the collimator 38. The mechanism selectively positions the first portion 40, the second portion 42, or both in a horizontal direction to align the first and second portions of the collimator 38. Aligning the first and second portions 40 and 42 produces uniformity images through the split collimator 38 which are comparable to conventional uniformity images from a conventional non-split collimator. Optionally, the first and second portions are positioned in a selected misaligned relationship to produce various desired collimation effects.

With further reference to FIGS. 3A and 3B, in the embodiment having the radiation source 52 disposed within the space 44, a drive mechanism having belts 56 selectively moves the source holder 54 and the radiation source 52 across the space 44. The belts are driven by an arrangement of pulleys 58 and a gear motor 60. Other drives for moving the source, such as screwdrives, pneumatic drives, and the like, are also contemplated. The source holder 54 is readily removable from the drive mechanism in order to replace the radiation source 40.

At each end of the radiation source motion range, is a shielded park position 62, in which the open side of the source holder is covered by a lead or other radiation blocking shield. While the source holder 54 is in the park position, the radiation from the radiation source 52 is blocked in all directions. Thus, the subject is prevented from receiving a higher radiation dose than is necessary to create the transmission image. After each scan of the radiation source, the source holder 54 remains in the park position until the gantry increments or rotates to a next angular scan position. The shielded park position 62 also prevents an operator from being exposed to radiation during collimator exchange, transport, and storage.

Conventional gamma detector heads image radiation in two or more energy windows or ranges simultaneously. In a conventional dual energy gamma detector head, the sum signals are sorted based on amplitude. More specifically, energy windows or ranges are defined. Each window corresponds to a photopeak or energy spectrum of a radionuclide to be used in the examination. When using a radiation source 52, the injected or emission radionuclide has one preselected energy and the radiation source 52 or transmissive radiation has a second, different energy. In this manner, the detector heads 32 and 34 separate the transmission and emission radiation data by using the conventional energy separation circuitry used during dual injected radiopharmaceutical examinations. A position resolver (not shown) resolves the position on the crystal, hence the ray angle, corresponding to scintillations or radiation events within each of the energy windows.

During a scanning operation, the collimator 38 of the preferred embodiment limits the emission and transmission radiation received by the detector face to radiation travelling generally perpendicular to the face. The non-perpendicular radiation is primarily absorbed by the collimator walls. Concurrently, the radiation source 52 and source holder 54 are moved across the length of the collimator by the drive mechanism. The transmission radiation from the radiation source 52 is also restricted by its associated collimator such that only radiation that is substantially parallel to the collimator is allowed to pass through the collimator towards the subject. Thus, radiation which is not useful in creating a transmission image is prevented from being transmitted and absorbed by the subject. The transmission radiation from the radiation source which passes through the collimator enters the subject and is attenuated by the subject and received by the opposite detector. The transmission radiation received by the opposite detector is used to create transmission projection data.

With reference again to FIG. 1, a reconstruction technique for emission and transmission data is provided. Of course, the reconstruction technique changes according to the types of radiation collected and the types of collimators used (i.e., fan, cone, parallel beam). Emission radiation from the subject is received by both detector heads 32 and 34 and emission projection data is generated. The emission data normally contains inaccuracies caused by varying absorption characteristics of the subject's anatomy. A sorter 64 sorts the emission projection data and transmission projection data on the basis of the relative energies. The data are stored in a projection view memory 66, more specifically in corresponding emission data memory 66e and transmission data memory 66t. A reconstruction processor 68t reconstructs the transmission data into a transmission image representation or volume of attenuation factors stored in a memory 70. Each voxel value stored in the memory 70 is indicative of attenuation of tissue in a corresponding location within the patient. An emission data correction means 72 corrects the emission data in accordance with the attenuation factors determined from the transmission data. More specifically, for each ray along which emission data is received, the emission correction means calculates a corresponding ray through the transmission attenuation factors stored in the memory 70. Each ray of the emission data is then weighted or corrected 72 in accordance with the attenuation factors and reconstructed by an emission radiation reconstruction processor 68e to generate a three-dimensional emission image representation that is stored in a volumetric image memory 74. A video processor 76 withdraws selected portions of the data from the image memory 74 to generate corresponding human-readable displays on a video monitor 78. Typical displays include reprojections, selected slices or planes, surface renderings, and the like.

In an alternative embodiment, a radiation source 40 is disposed within the space 44 in each collimator 38 of each detector head. Each detector head receives both emission and transmission radiation and generates corresponding emission and transmission projection data.

In another alternative embodiment, the collimator 38 is constructed to provide a pocket or space within its vanes without splitting the collimator 38 into two separate portions.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A diagnostic imaging system comprising:
   a gantry for movably supporting a detector head, the detector head receiving radiation from an examination region and generating data indicative thereof;
   a detector collimator disposed between a radiation receiving face of the detector head and the examination region for collimating the radiation received by the detector head, the collimator being separated laterally into a first portion and a second portion both extending laterally across the detector, the first portion and the second portion being spaced from each other defining a lateral gap therebetween such that the radiation from the examination region is collimated through both the first and second portions of the collimator before being received by the detector head; and,
   a reconstruction processor for reconstructing an image representation from the data generated.

2. The diagnostic imaging system as set forth in claim 1 further including a means for selectively positioning the first portion relative to the second portion.

3. The diagnostic imaging system as set forth in claim 2 wherein the first and second portions have septa which define holes of a common size, the first portion being mounted with its septa aligned with the septa of the second portion.

4. The diagnostic imaging system as set forth in claim 1 wherein the first portion includes a first collimation pattern and the second portion includes a second collimation pattern different from the first collimation pattern.

5. The diagnostic imaging system as set forth in claim 1 further including a construction disposed in the gap defined between the first and second portions for movement along the gap.

6. A diagnostic imaging system comprising:
   a gantry for movably supporting a detector head, the detector head receiving radiation from an examination region and generating data indicative thereof;
   a collimator disposed between a radiation receiving face of the detector head and the examination region for collimating the radiation received by the detector head, the collimator being separated laterally into a first portion and a second portion, the first portion and the second portion being spaced from each other defining a lateral gap therebetween;

one of a transmission radiation source, a calibration source, a radiation filter, an ion chamber, and a screen film imaging device disposed in the gap; and a reconstruction processor for reconstructing an image representation from the data generated.

7. The diagnostic imaging system as set forth in claim 1 further including:

a source holder of a radiation blocking material movably mounted in the gap for lateral movement there across, the source holder defining a groove in which a line radiation source is mounted.

8. The diagnostic imaging system as set forth in claim 7 wherein the groove is defined by parallel side walls, which side walls collimate radiation emitted by the line source.

9. In a diagnostic imaging system for examining a subject in an examination region who has been injected with a radiopharmaceutical having a first characteristic energy level, the imaging system including at least one detector head mounted adjacent the examination region for receiving emission radiation emitted by the radiopharmaceutical and a reconstruction processor for reconstructing an image representation based on the radiation received by the at least one detector head, the improvement comprising:

a collimator having a first portion and a second portion both disposed between the examination region and the detector head and the first portion extending along a radiation receiving face of the detector and the second portion extending along the first portion, the first and second collimator portions being spaced to define a gap therebetween.

10. In a diagnostic imaging system for examining a subject in an examination region who has been injected with a radiopharmaceutical having a first characteristic energy level, the imaging system including at least one detector head mounted adjacent the examination region for receiving emission radiation emitted by the radiopharmaceutical and a reconstruction processor for reconstructing an image representation based on the radiation received by the at least one detector head, the improvement comprising:

a collimator having a first portion and a second portion disposed between the examination region and the detector head, the first and second collimator portions being spaced to define a gap therebetween; and a radiation source disposed within the gap between the first and second portions of the collimator.

11. In the diagnostic imaging system as set forth in claim 10, the improvement further including a means for selectively translating the radiation source across the gap.

12. In the diagnostic imaging system as set forth in claim 10, the improvement further including a generally U-shaped radiation blocking element which carries the radiation source therein, the generally U-shaped element having an opening disposed toward the first portion of the collimator and being closed toward the second portion of the collimator, such that radiation is transmitted through the first portion of the collimator.

13. A method of diagnostic imaging with a camera system including a detector head for receiving radiation traversing an examination region, the detector head having a collimator mounted on a radiation receiving face thereof between the detector head and the examination region, the method comprising:

providing a lateral gap parallel to the radiation receiving face within the collimator;

injecting a radiopharmaceutical into a subject in the examination region, the radiopharmaceutical emitting radiation;

moving the detector head around the examination region;

collimating the emitted radiation through the collimator; and, receiving the emitted radiation with the detector head.

14. The method of diagnostic imaging as set forth in claim 13 further including moving a transmission radiation source along the collimator gap.

15. A method of diagnostic imaging with a camera system including a detector head for receiving radiation traversing an examination region, the detector head having a collimator mounted on a radiation receiving face thereof, the collimator having a lateral gap defined between a first portion of the collimator and a second portion of the collimator disposed between the examination region and the radiation receiving face of the detector head, and a transmission radiation source moveably mounted in the gap, the method comprising:

injecting a radiopharmaceutical into a subject in the examination region, the radiopharmaceutical emitting radiation;

translating the transmission radiation source through the gap such that (1) a portion of the radiation from the radiation source is transmitted through the first collimator portion to the subject and (2) a portion of the radiation is backscattered, strikes the second collimator portion at an angle, and is absorbed by the second collimator portion;

moving the detector head around the examination region;

collimating the emitted radiation through the collimator; and, receiving the emitted radiation with the detector head.

16. A detector collimator for diagnostic imaging systems which includes a detector head having a radiation receiving face for receiving radiation from a subject injected with a radiopharmaceutical, which radiation has passed through the detector collimator, the collimator comprising:

a first collimator section including a plurality of septa extending between a subject facing surface and a detector facing surface of the first collimator section;

a second collimator section including a plurality of septa extending between a subject facing surface and a detector facing surface of the second collimator section; and, a mechanical structure that joins the first and second collimator sections in a spaced relationship with a space in between, the first and second collimator sections both being disposed parallel to the radiation receiving face between the subject and the detector head.

17. The detector collimator as set forth in claim 16 further including at least one of a transmission radiation source, a calibration source, a radiation filter, an ion chamber, and a screen film imaging device disposed within a space between the first and second collimator sections.

18. The detector collimator as set forth in claim 16 wherein a radiation line source is movably mounted within a space between the first and second collimator sections.

* * * * *